UNITED STATES PATENT OFFICE.

JOHN TAYLOR, OF LAWRENCE, MASSACHUSETTS.

PRINTER'S BLANKET.

Specification forming part of Letters Patent No. 49,804, dated September 5, 1865.

*To all whom it may concern:*

Be it known that I, JOHN TAYLOR, of Lawrence, in the county of Essex and State of Massachusetts, have invented an Improvement in Printing-Blankets; and I do hereby declare that the following is a full and exact description of the same.

The india-rubber blankets heretofore used upon machines for printing calicoes, muslins, and other fabrics have been made of vulcanized rubber having a cloth or canvas back, the whole length of the rubber blanket being about twenty or thirty yards, and of a width suitable for the cloth that is to be printed. The ends are joined forming an endless apron or bed, upon which the cloth to be printed lies as it passes over the printing cylinders or rolls. For the purpose of absorbing the color or paste that strikes through the cloth, an apron of brown cotton cloth is interposed between the india-rubber blanket and the cloth that is to be printed. This cloth is soon soiled and requires to be changed often. The india-rubber surface of the blanket repels moisture, and none of the waste color or paste is absorbed by it.

The object of my improvement is to secure an absorbent surface to the blanket, and also to obtain a peculiar elastic or yielding bed for the cloth. To effect this I mix with the common india-rubber and sulphur compound, when in the plastic state, and previous to its application to the canvas which forms the back of the blanket or apron, about one-half its volume of powdered or pulverized cork, and this mixture or compound is then applied to the canvas in the manner well known to manufacturers of rubber belting. The ends of the blanket being joined it is vulcanized and subsequently brought to a uniform thickness by grinding or rubbing. When this is done the surface is found to be smooth, slightly yielding, and absorbent, consisting principally of cork, the particles of which are embedded in the rubber. I then secure an absorbent surface into which color may enter and be subsequently expelled by pressure or otherwise, this quality of absorption not being possessed by any rubber blankets heretofore made. The cork surface of the blanket has also a peculiar kind of elasticity, which renders it capable of taking all the color or paste out of the engraved or intaglio parts of the printing-roller, while with the common rubber blanket a part of the color remains in the engraving instead of leaving it and becoming attached to the cloth that is being printed. When my improved blanket is used the engraving may therefore be of less depth than usual, and without reducing the thickness or quantity of color that is applied to the cloth.

In some cases I apply a suitable varnish or cement to the face of a common vulcanized rubber blanket, and cover this with the cork-dust or particles, thus forming a surface of cork which is then rolled in and brought to a uniform level.

Other absorbent or porous substances may be used instead of the cork, and I do not claim any particular mode or process of making the blanket.

What I claim and desire to secure by Letters Patent, as a new article of manufacture, is—

An india-rubber printing-blanket having an absorbent and slightly-elastic or yielding surface composed of cork or other suitable substance, for the purpose specified.

JOHN TAYLOR. [L. S.]

In presence of—
 JONA. C. BOWKER,
 JAMES WATTS.